(12) United States Patent
Baxter et al.

(10) Patent No.: US 10,539,382 B2
(45) Date of Patent: Jan. 21, 2020

(54) APPARATUS AND METHOD FOR INTRACHANNEL DEFOULING OF A HEAT EXCHANGER USING INDUCTION HEATERS

(71) Applicants: Larry Baxter, Orem, UT (US); Aaron Sayre, Spanish Fork, UT (US); Eric Mansfield, Spanish Fork, UT (US); Nathan Davis, Bountiful, UT (US)

(72) Inventors: Larry Baxter, Orem, UT (US); Aaron Sayre, Spanish Fork, UT (US); Eric Mansfield, Spanish Fork, UT (US); Nathan Davis, Bountiful, UT (US)

(73) Assignee: Hall Labs LLC, Provo, UT (US)

( * ) Notice: Subject to any disclaimer, the term of this patent is extended or adjusted under 35 U.S.C. 154(b) by 167 days.

(21) Appl. No.: 15/592,680

(22) Filed: May 11, 2017

(65) Prior Publication Data

US 2018/0328680 A1 Nov. 15, 2018

(51) Int. Cl.
| | |
|---|---|
| *F28G 13/00* | (2006.01) |
| *F28D 9/00* | (2006.01) |
| *F28D 7/00* | (2006.01) |
| *H05B 6/10* | (2006.01) |
| *F28G 15/00* | (2006.01) |

(52) U.S. Cl.
CPC ............. *F28G 13/005* (2013.01); *F28D 7/00* (2013.01); *F28D 9/00* (2013.01); *F28G 15/003* (2013.01); *H05B 6/108* (2013.01); *H05B 2214/03* (2013.01)

(58) Field of Classification Search
CPC .................................................... F28G 13/005
USPC .......................................................... 165/95
See application file for complete search history.

(56) References Cited

U.S. PATENT DOCUMENTS

| | | | | |
|---|---|---|---|---|
| 4,175,614 A | * | 11/1979 | Huggins | ................. F24C 15/20 126/299 D |
| 5,272,720 A | * | 12/1993 | Cignetti et al. | ...... B22D 41/015 373/151 |
| 2005/0274503 A1 | * | 12/2005 | Gong et al. | ............... F28F 1/32 165/151 |
| 2010/0252241 A1 | * | 10/2010 | McDermott et al. | ........................ C23C 28/042 165/151 |
| 2011/0132588 A1 | * | 6/2011 | Petrenko et al. | ... F24D 19/0095 165/181 |

FOREIGN PATENT DOCUMENTS

JP 2010121847 A * 6/2010

* cited by examiner

*Primary Examiner* — Allen J Flanigan

(57) ABSTRACT

An apparatus comprising a heat exchanger and one or more induction heating elements is disclosed. The heat exchanger comprises a coolant side conduit and a process side conduit, the process side conduit being susceptible to fouling by at least partial desublimation, condensation, crystallization, deposition, or combinations thereof of a fouling component of a circulating process fluid. An electrically conductive first metal is disposed adjacent to the process side conduit. The one or more induction heating elements are disposed proximate to the heat exchanger. The one or more induction heating elements are connected to a source of electrical current. When the electrical current flows through the induction heating elements, eddy currents are induced in the first metal, heating the first metal such that the fouling component sublimates, melts, absorbs, or a combination thereof into the circulating process fluid.

7 Claims, 13 Drawing Sheets

100

101
Provide a heat exchanger comprising a process side and a coolant side

102
Provide a coolant to the coolant side

103
Provide a process fluid, comprising a carrier liquid and a fouling component, to the process side

104
Cool the process fluid, causing a portion of the fouling component to become a foulant on the outer surface of the coolant side

105
Provide current to an induction heat coil or coils

106
Inductively heat the first metal

107
Melt, absorb, or combinations thereof the foulant off the outer surface

108
Stop current until foulant builds up again

201
Provide a heat exchanger comprising a process side and a coolant side

202
Provide a liquid $N_2$ to the coolant side

203
Provide a process fluid, comprising isopentane and carbon dioxide, to the process side

204
Cool the process fluid, causing a portion of the carbon dioxide to become a $CO_2$-solid on the outer surface of the coolant side

205
Provide current to an induction heat coil or coils

206
Inductively heat the copper

207
Melt, absorb, or combinations thereof the $CO_2$-solid off the outer surface

208
Stop current until foulant builds up again

FIG. 2

APPARATUS AND METHOD FOR INTRACHANNEL DEFOULING OF A HEAT EXCHANGER USING INDUCTION HEATERS

This invention was made with government support under DE-FE0028697 awarded by The Department of Energy. The government has certain rights in the invention.

FIELD OF THE INVENTION

This invention relates generally to operation of heat exchangers. More particularly, we are interested in removing foulants from an operating heat exchanger.

BACKGROUND

Heat exchangers have uses in all industries across the world. The greatest difficulty with indirect-contact heat exchangers lies in fouling. Solids, liquids, or gases from the process fluid or the heating/cooling fluid can deposit on the walls, react with the walls, desublimate and deposit, or any number of other processes to coat the walls with foulants. Removal of these foulants while still operating the exchanger has been studied extensively. However, cryogenic heat exchange is a relatively young industry and foulant removal during operations is not as thoroughly studied. A unique difficulty in cryogenics is the desublimation or condensation and solidification of components in the process fluid onto the walls. Methods for removing these foulants center around melting the solids back into the process fluid. However, these techniques often involve shutting down coolant flow. Without coolant flow, the exchanger warms up due to process fluid, direct heat can be applied to the tubes/plates of the exchanger, or warm fluid can be passed through the coolant side. However, the ability to remove these foulants without shutting down either the process or coolant sides of the exchanger is needed.

Induction heaters are used when direct heating is difficult or impossible. Induction heaters can induce eddy currents in a conducting object, typically metals. This type of heating is used in furnaces, welding, cooking, brazing, sealing, and plastics processing. The inventors are unaware of any applications where induction heating is used to heat up metal in the walls of heat exchangers and thereby melt foulants off the walls.

U.S. Pat. No. 6,023,944, to Blundell teaches an apparatus and method for processing a sublimed material. A sublimed gaseous substance is directly contacted by a coolant fluid, causing the sublimed substance to desublimate and fall into a tank. The tank is at an elevated pressure such that, when the tank is heated, the desublimated solid melts to form a liquid. The heat may be supplied by various heaters, including induction heaters. The present disclosure differs from this prior art disclosure in that direct-contact heat exchange is used, solids formed are not deposited on a surface of the heat exchanger, and the induction heater is not used to melt the solids back into a process fluid, but rather are melted to form a product liquid. This prior art disclosure is pertinent and may benefit from the devices and methods disclosed herein and is hereby incorporated for reference in its entirety for all that it teaches.

U.S. Pat. No. 9,254,448, to Turner, et al., teaches a sublimation system and associated devices. A slurry is passed into a heat exchanger which vaporizes the fluid portion of the slurry. The vapor and the solids are then passed to a second heat exchanger, where the solids are sublimated. The present disclosure differs from this prior art disclosure in that the first heat exchanger provides heat to the slurry to vaporize the liquid, the solids are sublimated in the second heat exchanger rather than being melted back into the liquid, and induction heaters are not used. This prior art disclosure is pertinent and may benefit from the devices and methods disclosed herein and is hereby incorporated for reference in its entirety for all that it teaches.

SUMMARY

An apparatus comprising a heat exchanger and one or more induction heating elements is disclosed. The heat exchanger comprises a coolant side conduit and a process side conduit, the process side conduit being susceptible to fouling by at least partial desublimation, condensation, crystallization, deposition, or combinations thereof of a fouling component of a circulating process fluid. An electrically conductive first metal is disposed adjacent to the process side conduit. The one or more induction heating elements are disposed proximate to the heat exchanger. The one or more induction heating elements are connected to a source of electrical current. When the electrical current flows through the induction heating elements, eddy currents are induced in the first metal, heating the first metal such that the fouling component sublimates, melts, absorbs, or a combination thereof into the circulating process fluid.

The heat exchanger may comprise a shell and tube style exchanger, plate style exchanger, plate and frame style exchanger, plate and shell style exchanger, spiral style exchanger, plate fin style exchanger, or combinations thereof.

The heat exchanger may comprise a U-tube bundle shell and tube heat exchanger, wherein the first portions of the wall consist of pipe bends. The one or more induction heating elements may be positioned such that the pipe bends each have at least one of the induction heating elements inducing current in the first metal of the pipe bends.

The heat exchanger may comprise a plate and frame heat exchanger, wherein the plates comprise alternating strips of the first metal and strips of a second material. The second material may comprise a non-conductive material. In this case, the one or more induction heating elements may be positioned such that the one or more induction heating elements induce eddy currents in the first metal. The second material may comprise a second metal, wherein the second metal is more conductive than the first metal. In this case, the one or more induction heating elements may be positioned such that the one or more induction heating elements induce eddy currents in the first metal and the second metal.

The heat exchanger may comprise a plate and tube heat exchanger, wherein the tubes are the first metal. The induction heating element may be wrapped around the plate and tube heat exchanger.

The first metal may comprise aluminum, steel, copper, tungsten, brass, tin, bronze, nickel, or combinations thereof. A second portion or portions of the wall between the process side and the coolant side may comprise a second metal, the one or more induction heating elements inducing current in the second metal, inductively heating the second metal such that the foulant melts, absorbs, or combinations thereof off the inner surface of the process side. The second metal may comprise aluminum, steel, copper, tungsten, brass, tin, bronze, nickel, or combinations thereof. The first metal may comprise a portion of a refractory material, the refractory material further comprising ceramics.

The carrier liquid may comprise water, brine, hydrocarbons, liquid ammonia, liquid carbon dioxide, other cryogenic liquids, and combinations thereof. The carrier liquid may comprise 1,1,3-trimethylcyclopentane, 1,4-pentadiene, 1,5-hexadiene, 1-butene, 1-methyl-1-ethylcyclopentane, 1-pentene, 3,3,3,3-tetrafluoropropene, 3,3-dimethyl-1-butene, 3-chloro-1,1,1,2-tetrafluoroethane, 3-methylpentane, 3-methyl-1,4-pentadiene, 3-methyl-1-butene, 3-methyl-1-pentene, 3-methylpentane, 5-methyl-1-hexene, 5-methyl-1-pentene, 5-methylcyclopentene, 5-methyl-trans-2-pentene, bromochlorodifluoromethane, bromodifluoromethane, bromotrifluoroethylene, chlorotrifluoroethylene, cis 3-hexene, cis-1,3-pentadiene, cis-2-hexene, cis-2-pentene, dichlorodifluoromethane, difluoromethyl ether, trifluoromethyl ether, dimethyl ether, ethyl fluoride, ethyl mercaptan, hexafluoropropylene, isobutane, isobutene, isobutyl mercaptan, isopentane, isoprene, methyl isopropyl ether, methylcyclohexane, methylcyclopentane, methylcyclopropane, n,n-diethylmethylamine, octafluoropropane, pentafluoroethyl trifluorovinyl ether, propane, sec-butyl mercaptan, trans-2-pentene, trifluoromethyl trifluorovinyl ether, vinyl chloride, bromotrifluoromethane, chlorodifluoromethane, dimethyl silane, ketene, methyl silane, perchloryl fluoride, propylene, vinyl fluoride, methanol, ethanol, 1-propanol, 2-propanol, aqueous mixtures thereof, or combinations thereof.

The fouling component may comprise carbon dioxide, nitrogen oxide, sulfur dioxide, nitrogen dioxide, sulfur trioxide, hydrogen sulfide, hydrogen cyanide, water, condensed hydrocarbons, or combinations thereof. The fouling component may also comprise a solid portion comprising particulates, mercury, other heavy metals, condensed organics, soot, inorganic ash components, biomass, salts, water ice, other impurities common to a vitiated flow, producer gases, or other industrial flows, or combinations thereof.

The apparatus may further comprise freezing a portion of the carrier liquid onto the inner surface of the process side as a portion of the foulant.

The apparatus may further comprise varying the frequency of the current, the amount of the current, or both, to the one or more induction heating elements.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIG. 1 shows a apparatus for removing a foulant from a heat exchanger.

FIG. 2 shows a apparatus for removing a foulant from a heat exchanger.

DETAILED DESCRIPTION

Figure 3:
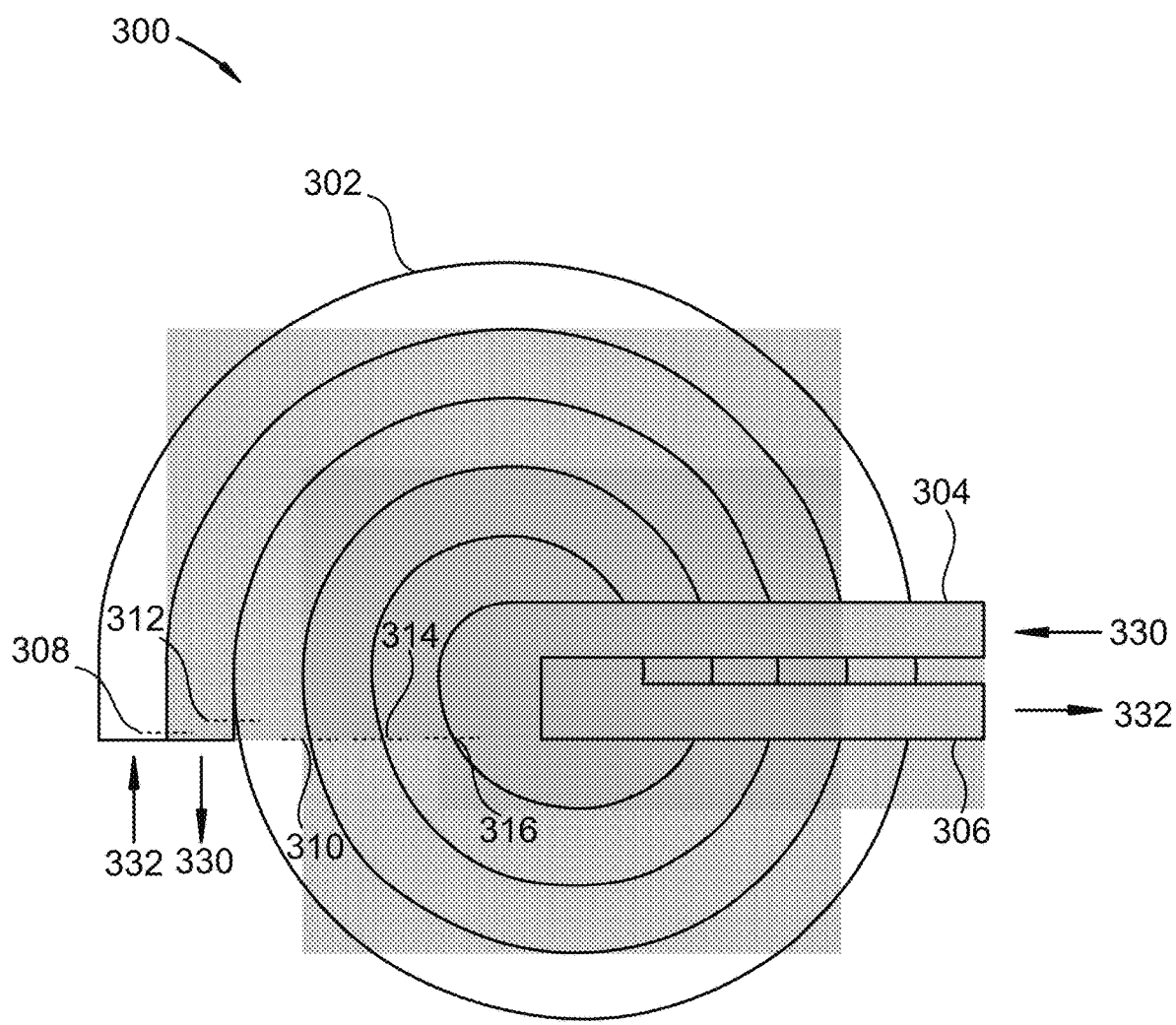
FIG. 3 shows a cross-sectional view of a spiral heat exchanger.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention.

Referring to FIG. 1, a method for removing a foulant from a heat exchanger is shown at 100, as per one embodiment of the present invention. A heat exchanger, comprising a process side and a coolant side, is provided 101. A first portion or portions of a wall between the process side and the coolant side comprises a first metal. A coolant is provided to the coolant side 102 and a process fluid, comprising a carrier liquid and a fouling component, is provided to the process side 103. The process fluid is cooled such that a portion of the fouling component desublimates, condenses, crystallizes, deposits, or combinations thereof onto an inner surface of the process side as the foulant, causing a restriction to flow of the process fluid 104. Current is provided to an induction heating elements 105. The induction heating elements are arranged around the heat exchanger such that the induction heating elements induce eddy currents in the first metal, inductively heating the first metal 106. This causes the foulant to sublimate, melt, absorb, or combinations thereof off the inner surface of the process side 107. The current is then stopped until foulant builds up on the surface again 108.

Referring to FIG. 2, a method for removing a foulant from a heat exchanger is shown at 200, as per one embodiment of the present invention. A heat exchanger, comprising a process side and a coolant side, is provided 201. A first portion or portions of a wall between the process side and the coolant side comprises copper. Liquid nitrogen is provided to the coolant side 202 and a process fluid, comprising isopentane and carbon dioxide, is provided to the process side 203. The process fluid is cooled such that a portion of the carbon dioxide desublimates, condenses, crystallizes, deposits, or combinations thereof onto an inner surface of the process side as a carbon dioxide solid, causing a restriction to flow of the process fluid 204. Current is provided to one or more induction heating elements 205. The one or more induction heating elements are arranged around the heat exchanger such that the one or more induction heating elements induce eddy currents in the copper, inductively heating the copper 206. This causes the carbon dioxide solid to sublimate, melt, absorb, or combinations thereof off the inner surface of the process side 207. The electrical current is then stopped until foulant builds up on the surface again 208.

Referring to FIG. 3, a cross-sectional view of a spiral heat exchanger is shown at 300, as per one embodiment of the present invention. Spiral heat exchanger 302, comprising process side conduit 306 and coolant side conduit 304, is provided. The walls between process side conduit 306 and coolant side conduit 304 consist of a series of metals. The outermost spiral, between 308 and 310, consists of copper. The wall between 312 and 314 consists of aluminum. The wall between 314 and the end of the spiral consists of brass. The last wall from 316 to the end of the spiral consists of stainless steel. Each material is separated from the next material by a non-conductive strip of a connecting material. Coolant 330 is provided to coolant side conduit 304. Process fluid 332 is provided to process side conduit 306. Process fluid 332 comprises a carrier liquid and a fouling component. Process fluid 332 is cooled such that a portion of the fouling component and a portion of the carrier liquid desublimate, condense, crystallize, deposit, or combinations thereof onto the outer surfaces of coolant side conduit 304 as the foulant, causing a restriction to flow of process fluid 332. Electrical current is provided to induction heating elements (not shown). The induction heating elements are arranged around the heat exchanger such that the less conductive, inner metals heat up more than the more conductive, outermost metals. As coolant 330 is coldest at the center of the spirals, this allows for directed heat where it is required, as more foulant will condense to the coldest portion of spiral exchanger 302. This causes the foulant to sublimate, melt, absorb, or combinations thereof off the outer surface of coolant side conduit 304. The electrical current is then stopped until foulant builds up on the surface again.

Figure 4:
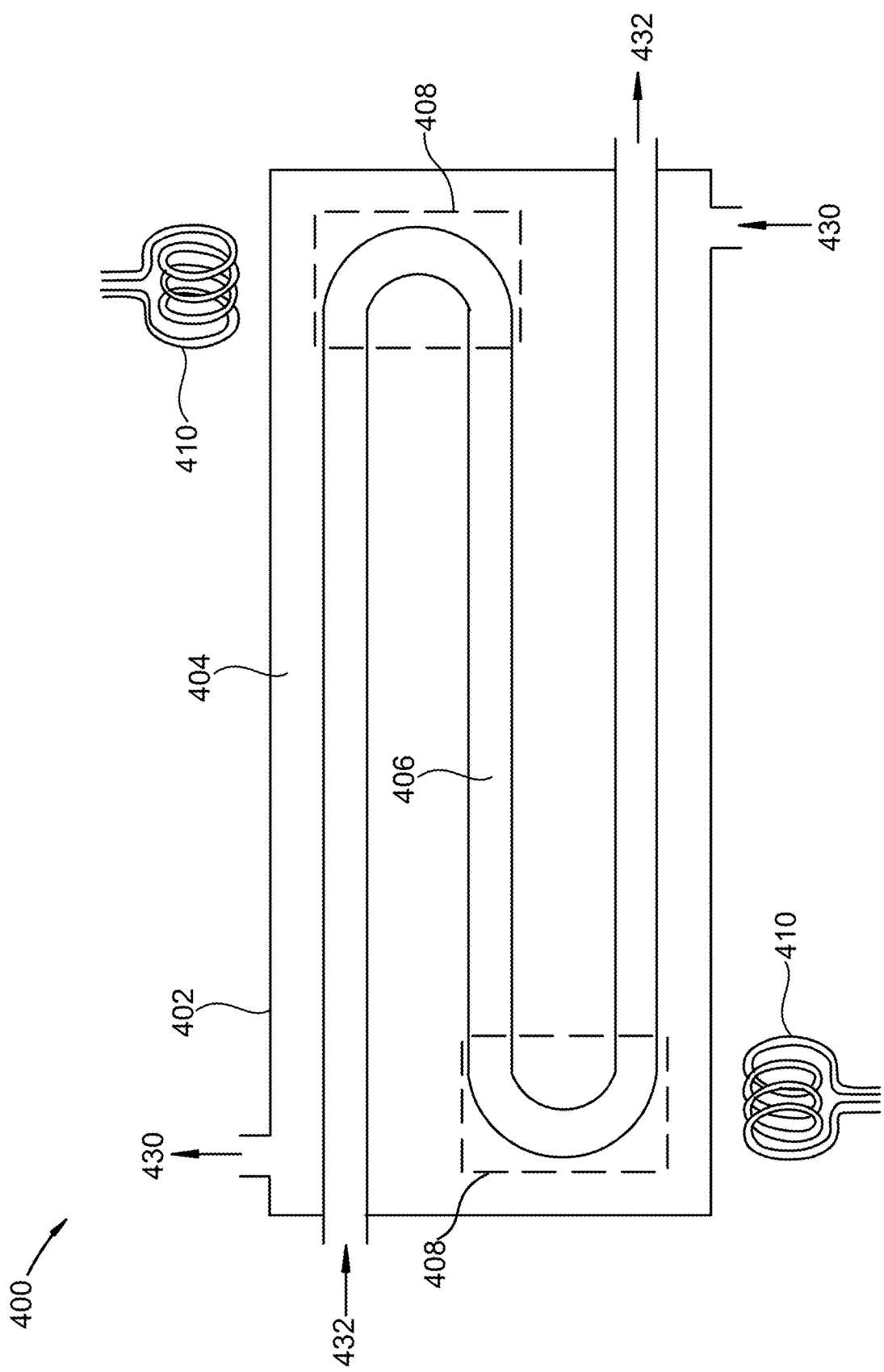
FIG. 4 shows a cross-sectional view of a shell and tube heat exchanger.

Referring to FIG. 4, a cross-sectional view of a shell and tube heat exchanger is shown at 400, as per one embodiment of the present invention. Heat exchanger 402, comprising process side conduit 406 and coolant side conduit 404, is provided. The walls between process side conduit 406 and coolant side conduit 404 consist of the walls of the tubes. Tube bends 408 comprise a less-conductive metal than the remainder of the tubes. Coolant 430 is provided to coolant side conduit 404. Process fluid 432 is provided to process side conduit 406. Process fluid 432 comprises a carrier liquid and a fouling component. Process fluid 432 is cooled such that a portion of the fouling component and a portion of the carrier liquid desublimate, condense, crystallize, deposit, or combinations thereof onto the outer surfaces of coolant side conduit 404 as the foulant, causing a restriction to flow of process fluid 432. The foulant build-up is greatest at tube bends 408, due to the velocity drop as the flow changes direction. Electrical current is provided to induction heating elements 410. Induction heating elements 410 are arranged near tube bends 408 such that the less-conductive metal heats up more than the more conductive metal. This allows for directed heating of tube bends 408. This causes the foulant to sublimate, melt, absorb, or combinations thereof off the outer surface of coolant side conduit 404. The electrical current is then stopped until foulant builds up on the surface again. In some embodiments, more inductive heating elements are provided to direct heating at the tubes between pipe bends 408. The amount of electrical current provided or the frequency of electrical current provided can be varied, allowing for heating to be tailored to the amount of foulant build-up in the straight tubes versus tube bends 408.

Figure 5:
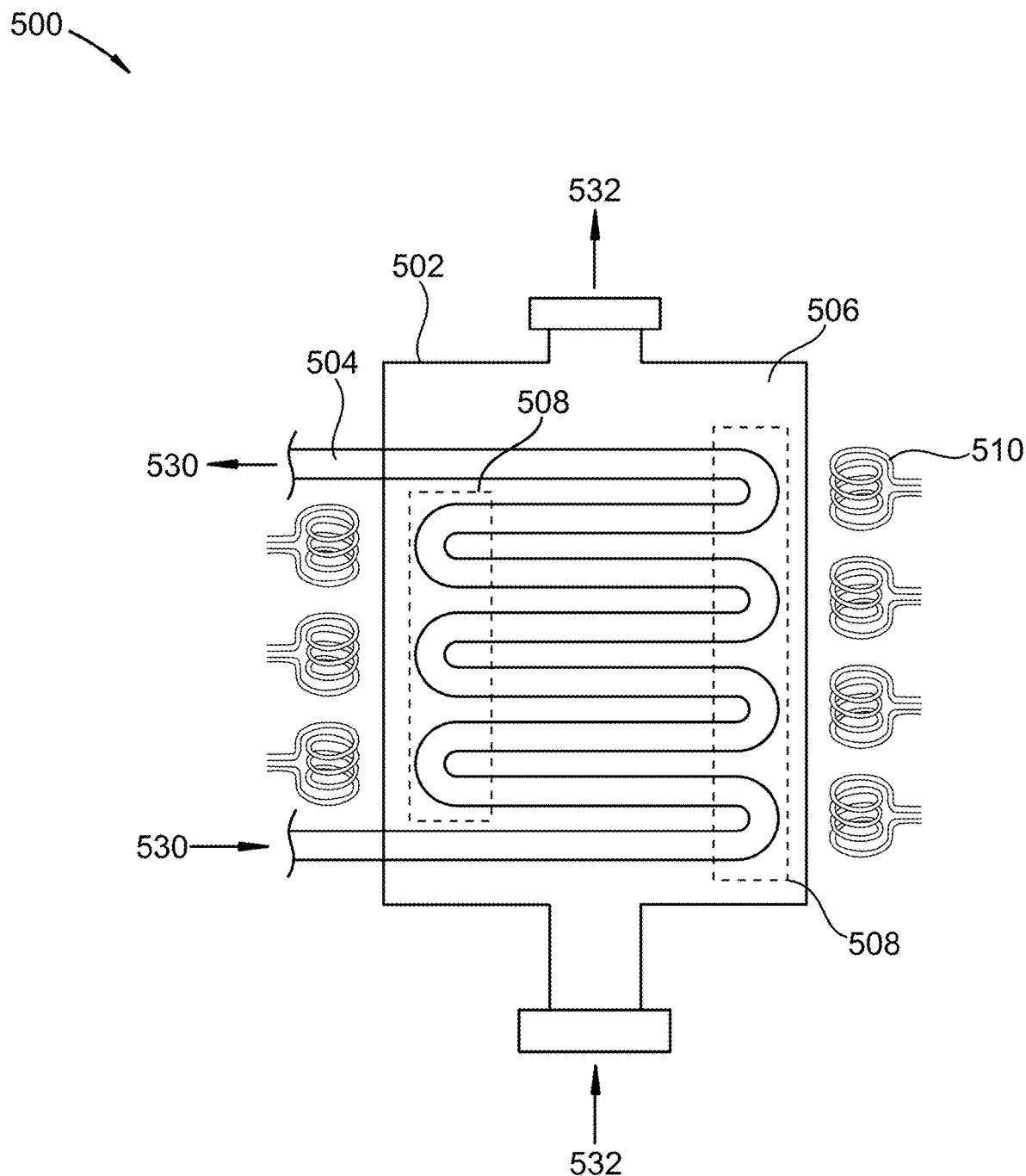
FIG. 5 shows a cross-sectional view of a shell and tube heat exchanger.

Referring to FIG. 5, a cross-sectional view of a shell and tube heat exchanger is shown at 500, as per one embodiment of the present invention. Heat exchanger 502, comprising process side conduit 506 and coolant side conduit 504, is provided. The walls between process side conduit 506 and coolant side conduit 504 consist of the outer walls of the tubes. Tube bends 508 comprise a less-conductive metal than the remainder of the tubes. Coolant 530 is provided to coolant side conduit 504. Process fluid 532 is provided to process side conduit 506. Process fluid 532 comprises a carrier liquid and a fouling component. Process fluid 532 is cooled such that a portion of the fouling component and a portion of the carrier liquid desublimate, condense, crystallize, deposit, or combinations thereof onto the outer surfaces of coolant side conduit 504 as the foulant, causing a restriction to flow of process fluid 532. Electrical current is provided to induction heating elements 510. Induction heating elements 510 are arranged around the circumference of heat exchanger 502 (elements in and out of the plane are not shown). The less-conductive metal heats up more than the more conductive metal. This allows for directed heating of tube bends 508 and of the straight sections of the tubes. This causes the foulant to sublimate, melt, absorb, or combinations thereof off the outer surface of coolant side conduit 504. The amount of electrical current provided or the frequency of electrical current provided can be varied, allowing for heating to be tailored to the amount of foulant build-up in the straight tubes versus tube bends 508. The electrical current is then stopped until foulant builds up on the surface again.

Figure 6:
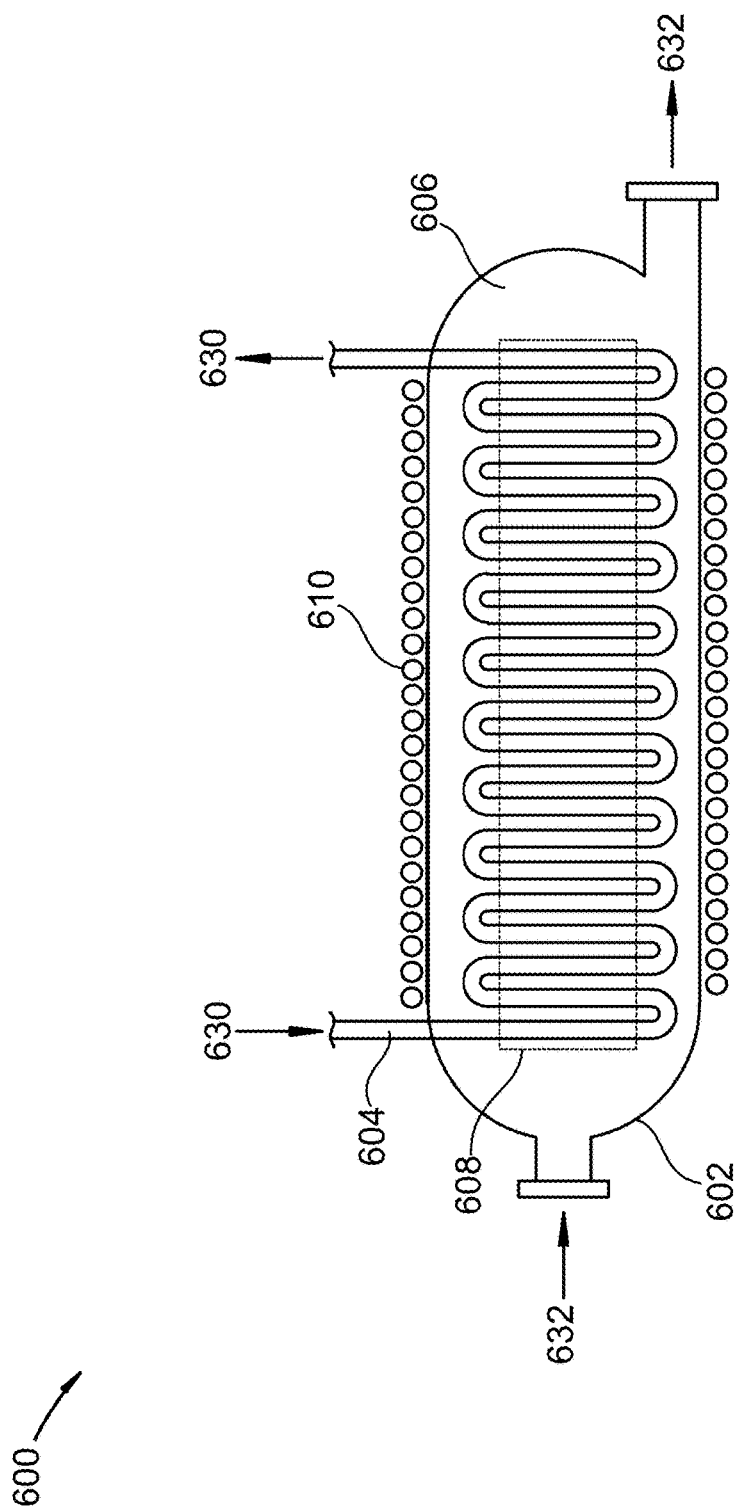
FIG. 6 shows a cross-sectional view of a shell and tube heat exchanger.

Referring to FIG. 6, a cross-sectional view of a shell and tube heat exchanger is shown at 600, as per one embodiment of the present invention. Heat exchanger 602, comprising process side conduit 606 and coolant side conduit 604, is provided. The walls between process side conduit 606 and coolant side conduit 604 consist of the walls of the tubes. Straight sections 608 are made of a less-conductive metal than the balance of the tubes. Coolant 630 is provided to coolant side conduit 604. Process fluid 632 is provided to process side conduit 606. Process fluid 632 comprises a carrier liquid and a fouling component. Process fluid 632 is cooled such that a portion of the fouling component and a portion of the carrier liquid desublimate, condense, crystallize, deposit, or combinations thereof onto the outer surfaces of coolant side conduit 604 as the foulant, causing a restriction to flow of process fluid 632. Electrical current is provided to induction heating element 610. Induction heating element 610 surround the majority of the exterior of heat exchanger 602. Due to the lower conductivity of straight tubes 608, even heating of the tubes can be accomplished by induction heating. This causes the foulant to sublimate, melt, absorb, or combinations thereof off the outer surface of coolant side conduit 604. The electrical current is then stopped until foulant builds up on the surface again. In some embodiments, straight tubes 608 are further split such that the center section of straight tubes 608 are a different, less-conductive metal than either of the other metals in use. This allows even more fine control over the amount of heating of each section.

Figure 7:
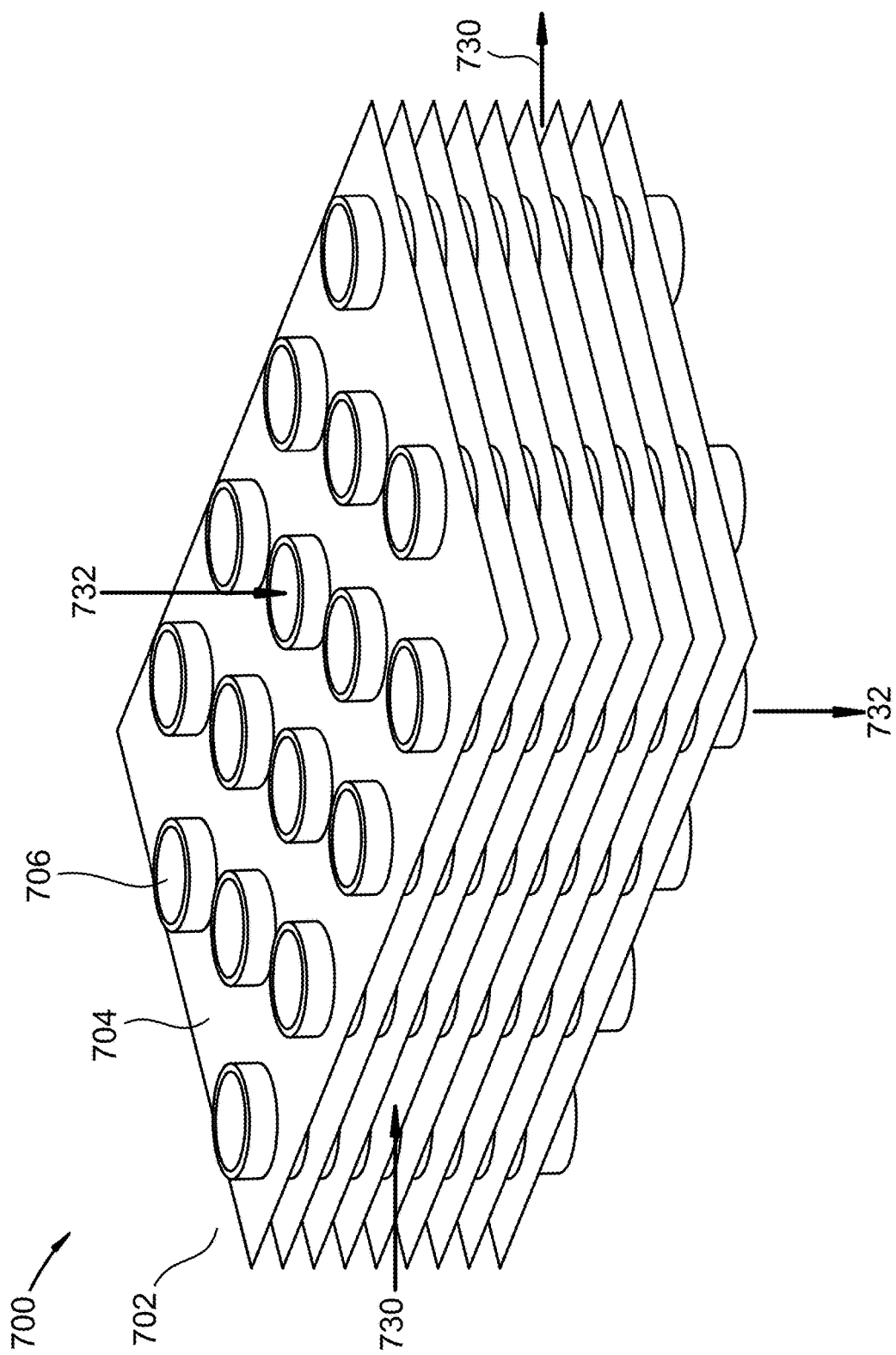
FIG. 7 shows an isometric view of the interior plates and tubes of a plate and tube heat exchanger.

Referring to FIG. 7, an isometric view of the interior plates and tubes of a plate and tube heat exchanger are shown at 700, as per one embodiment of the present invention. Heat exchanger 702, comprising tubes 706 and plates 704, is provided. The space between the tubes and the plates is the coolant side conduit. The space inside the tubes is the process side conduit. Tubes 706 comprise a metal. Plates 704 are structural and allow for different temperature coolant to be provided at different levels. Coolant 730 is provided to the coolant side conduit. Process fluid 732 is provided to the process side conduit. Process fluid 732 comprises a carrier liquid and a fouling component. Process fluid 732 is cooled such that a portion of the fouling component and a portion of the carrier liquid desublimate, condense, crystallize, deposit, or combinations thereof onto the inside of tubes 706 as the foulant, causing a restriction to flow of process fluid 732. Electrical current is provided to induction heating elements (not shown) arranged to provide induction heating to tubes 706, heating tubes 706. This causes the foulant to sublimate, melt, absorb, or combinations thereof off the inner surface of tubes 706. The electrical current is then stopped until foulant builds up on the surface again. In some embodiments, tubes 706 have varying compositions depending on distance from the edge of heat exchanger 702. In some embodiments, inclusions in tubes 706 are provided to vary conductivity, causing differential heating of tubes 706. In some embodiments, tubes 706 change compositions as they pass through plates 704.

Figure 8A:
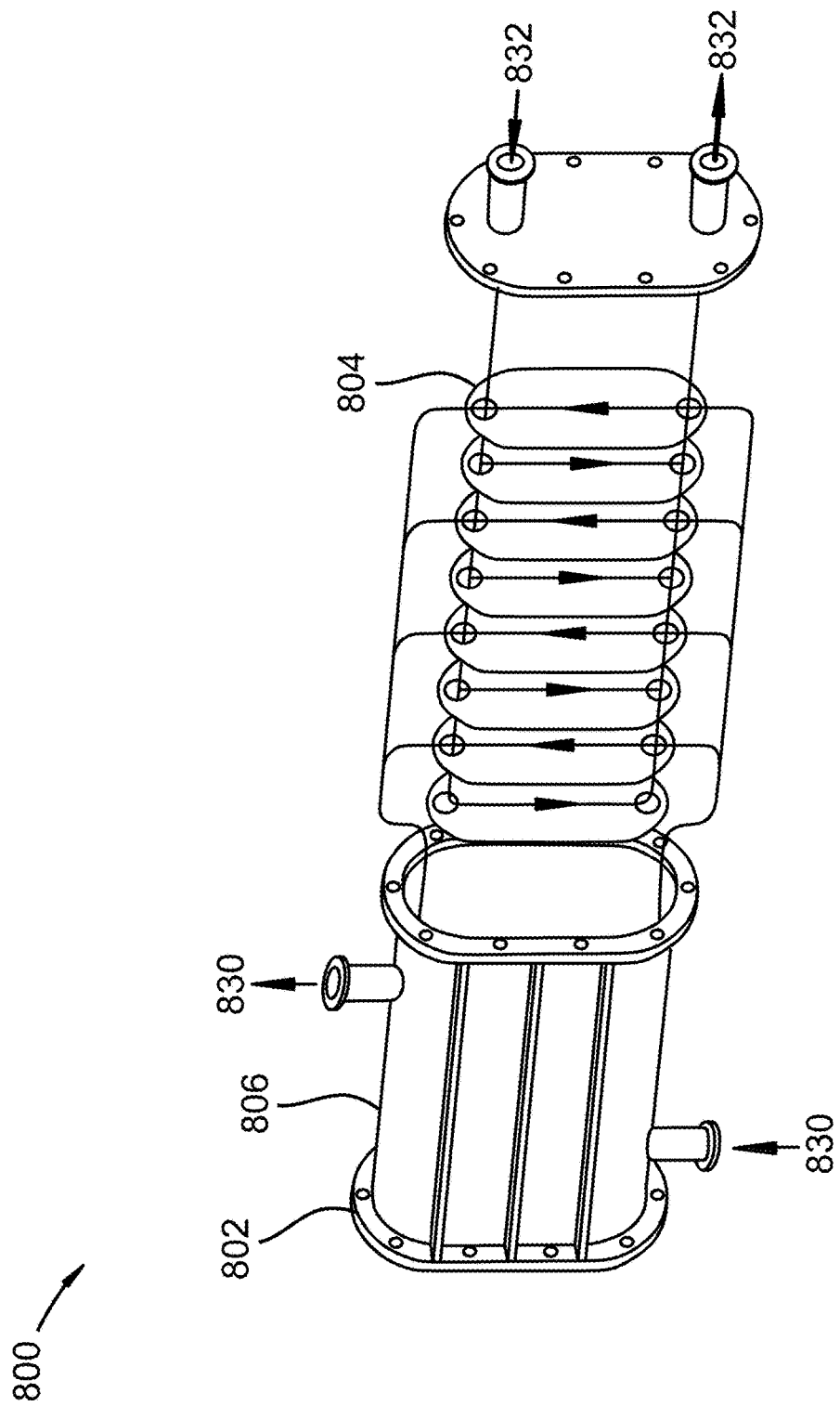
FIGS. 8A-B show an exploded isometric view of a shell and plate heat exchanger and a plate for use in the shell and plate exchanger.
Figure 8B:
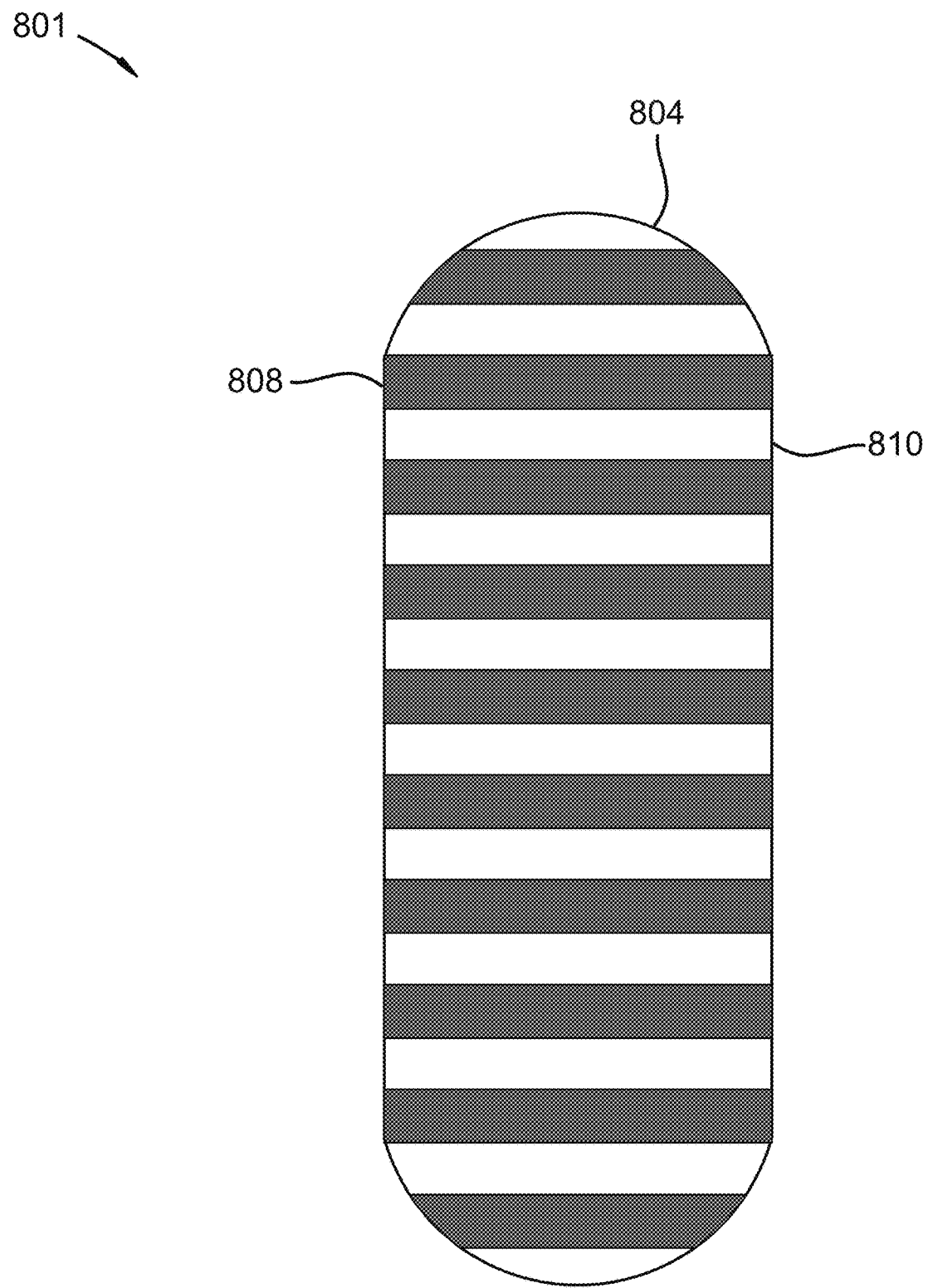

Referring to FIGS. 8A-B, an exploded isometric view of a shell and plate heat exchanger is shown at 800 and a plate for use in the shell and plate exchanger is shown at 801, as per one embodiment of the present invention. Heat exchanger 802, comprising shell 806 and plates 804, is provided. The space between the plates alternates as the coolant side conduit and the process side conduit. Plate 804 comprises two different metals, first metal 808 and second metal 810. Coolant 830 is provided to the coolant side conduit. Process fluid 832 is provided to the process side conduit. Process fluid 832 comprises a carrier liquid and a fouling component. Process fluid 832 is cooled such that a portion of the fouling component and a portion of the carrier liquid desublimate, condense, crystallize, deposit, or combinations thereof onto the process side conduit of plates 804 as the foulant, causing a restriction to flow of process fluid 832. Electrical current is provided to induction heating elements (not shown) arranged to provide induction heating to plates 804. The amount of heating varies between first metal 808 and second metal 810, due to different conductivities. This causes the foulant to sublimate, melt, absorb, or combinations thereof off the inner surface of tubes 806. The electrical current is then stopped until foulant builds up on the surface again. In some embodiments, plates 804 have different patterns of first and second metals, such as spiral patterns or vertical stripes. In some embodiments, inclusions in plates 804 are provided to vary conductivity, causing differential heating of plates 804. In some embodiments, narrow slots are provided in plates 804 which are filled with an epoxy, breaking up eddy currents in plates 804, changing heating profiles from induction heating.

Figure 9A:
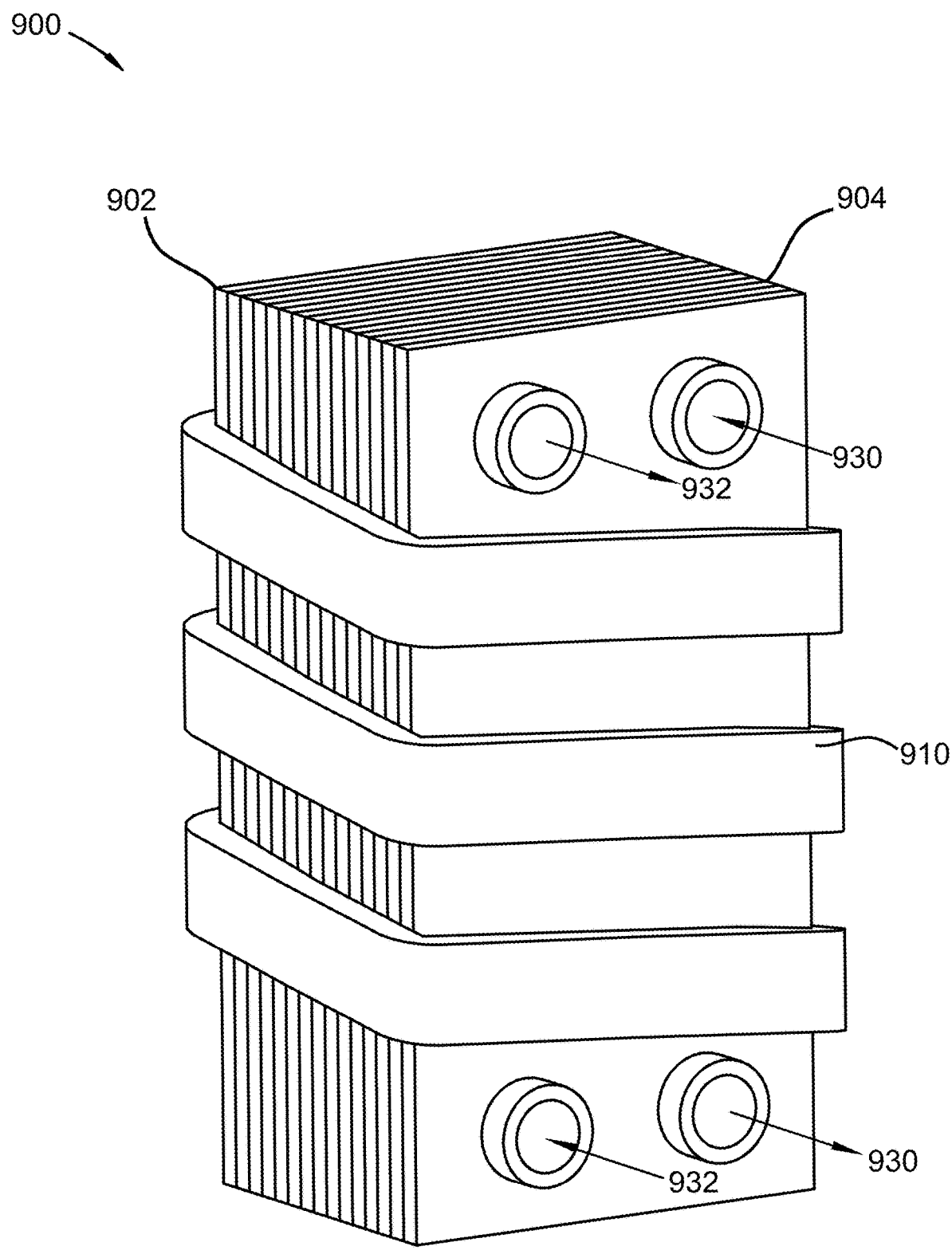
FIGS. 9A-B show an isometric view of a plate and frame heat exchanger with induction heating element and a plate for use in the plate and frame heat exchanger.
Figure 9B:
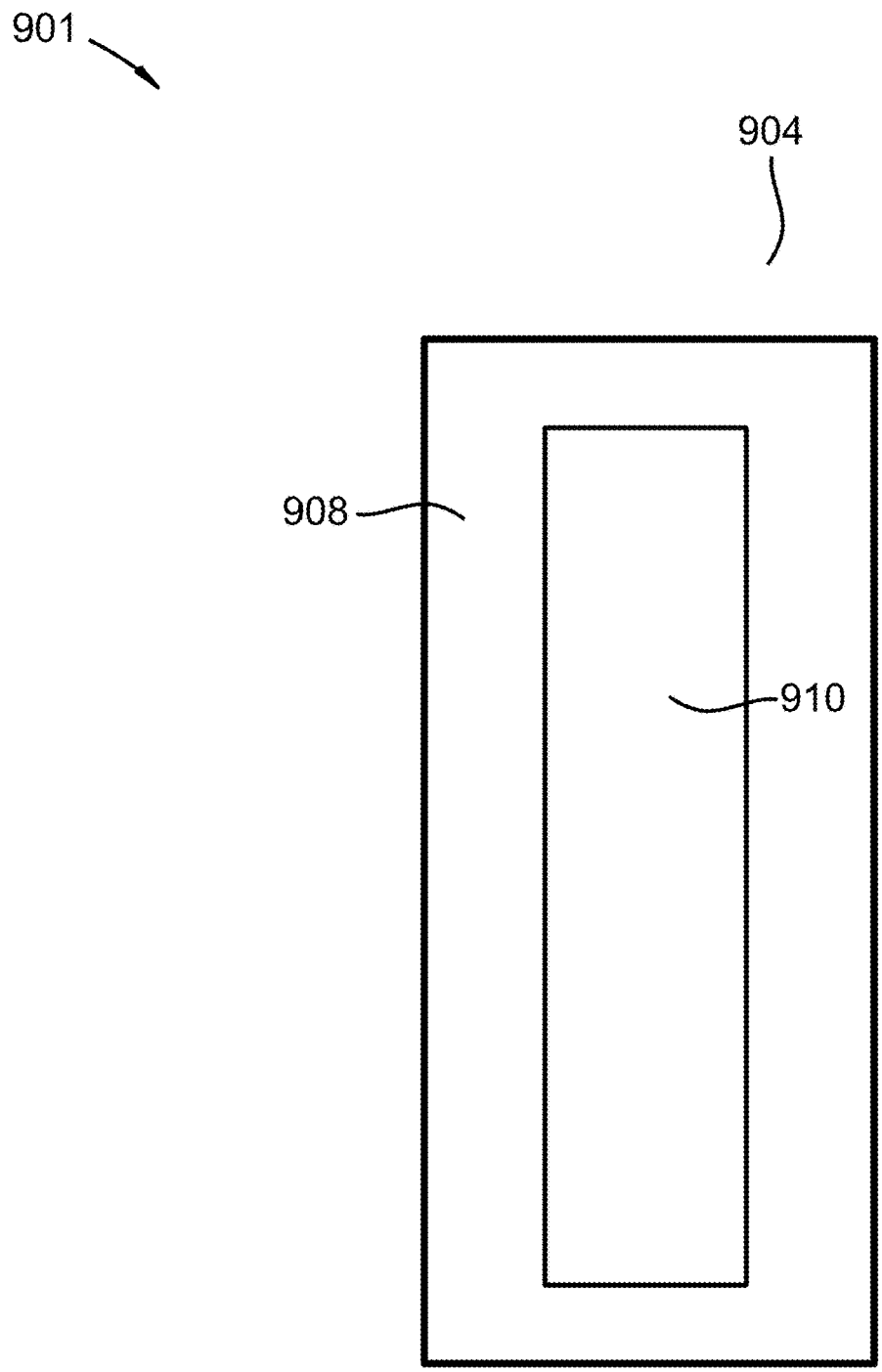

Referring to FIGS. 9A-B, an isometric view of a plate and frame heat exchanger with induction heating element is shown at 900 and a plate for use in the plate and frame heat exchanger is shown at 901, as per one embodiment of the present invention. Heat exchanger 902, comprising plates 904, is provided. The space between the plates alternates as the coolant side conduit and the process side conduit. Plates 904 comprise outer section 908 made of a high conductivity metal and inner section 910 made of a lower conductivity metal. Coolant 930 is provided to the coolant side conduit. Process fluid 932 is provided to the process side conduit. Process fluid 932 comprises a carrier liquid and a fouling component. Process fluid 932 is cooled such that a portion of the fouling component and a portion of the carrier liquid desublimate, condense, crystallize, deposit, or combinations thereof onto plates 904 as the foulant, causing a restriction to flow of process fluid 932. Electrical current is provided to induction heating element 910. Plates 904 are designed so that even heating of the plates can be provided due to the higher conductivity metal being on the exterior and the lower conductivity metal being on the interior, further from the elements. Induction heating causes the foulant to sublimate, melt, absorb, or combinations thereof off plates 904. The electrical current is then stopped until foulant builds up on the surface again. In some embodiments, inner section 910 is further split with another inner section, providing more fine control of heating. In some embodiments, a non-conductive material is used between metal sections. In some embodiments, plates 904 have indentations or holes with non-conductive patches or plugs for eddy current manipulation.

Figure 10:
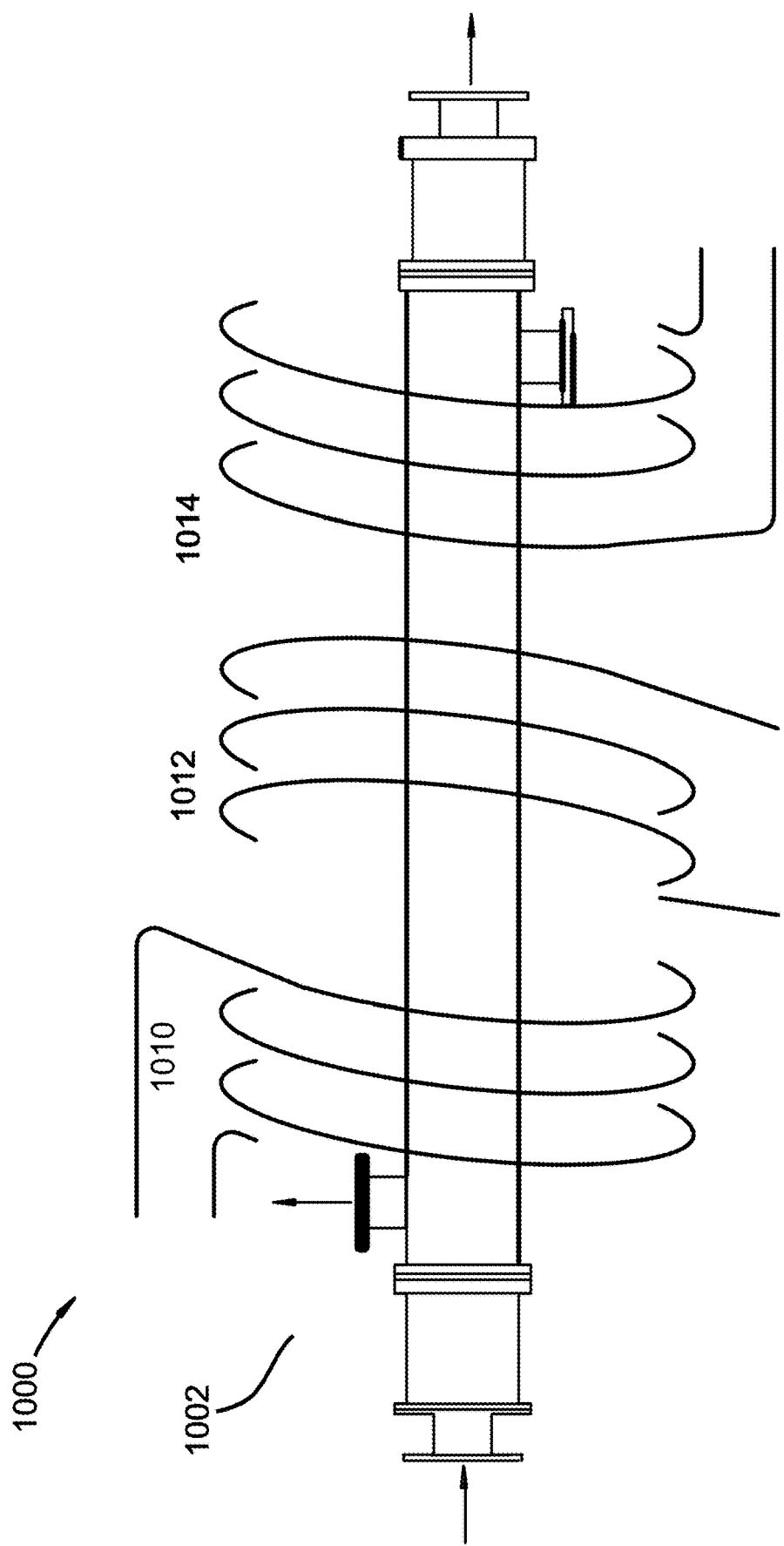
FIGS. 10 and 10A show a side view of a shell and tube heat exchanger with straight tubes and inductive heating elements.
Figure 10A:
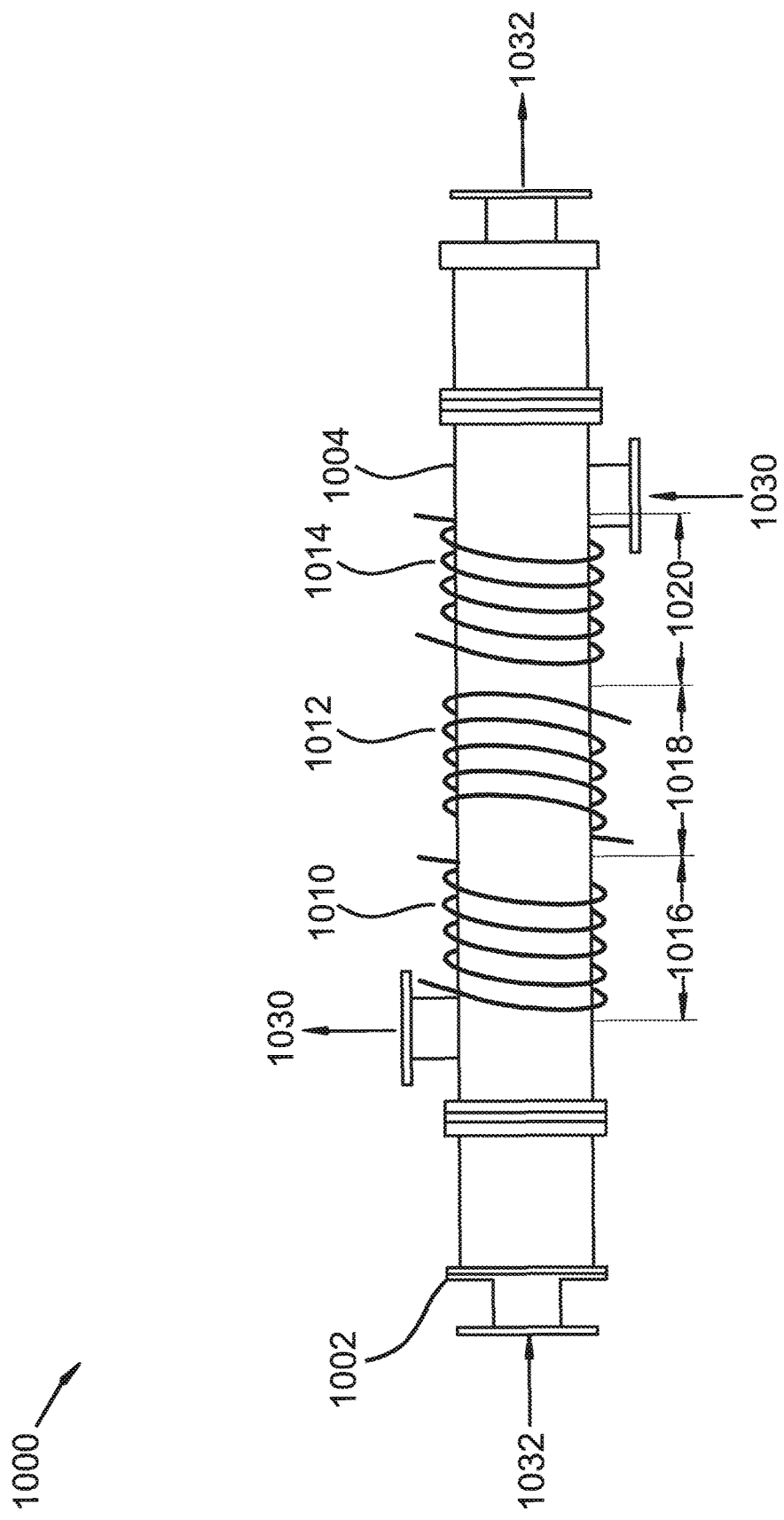

Referring to FIG. 10, a side conduit view of a shell and tube heat exchanger with straight tubes and inductive heating elements is shown at 1000, as per one embodiment of the present invention. Heat exchanger 1002, comprising shell 1004 and tubes (internal, not shown), is provided. The space between shell 1004 and the tubes comprises the coolant side conduit. The space inside the tubes comprises the process side conduit. The tubes comprise one metal. Coolant 1030 is provided to the coolant side conduit. Process fluid 1032 is provided to the process side conduit. Process fluid 1032 comprises a carrier liquid and a fouling component. Process fluid 1032 is cooled such that a portion of the fouling component and a portion of the carrier liquid desublimate, condense, crystallize, deposit, or combinations thereof onto the inside of the tubes as the foulant, causing a restriction to flow of process fluid 1032. Electrical current is provided to induction heating elements 1010, 1012, and 1014, wrapped around sections 1016, 1018, and 1020, respectively. Electrical current provided to elements 1010 is the lowest as the coolant is the warmest in section 1016 of heat exchanger 1002. Electrical current then increases in elements 1012 and elements 1014 as coolant temperature decreases through sections 1018 and 1020. This allows variable heat to be provided based upon the amount of foulant. This causes the foulant to sublimate, melt, absorb, or combinations thereof off the inner surface of the tubes. The electrical current is then stopped until foulant builds up on the surface again. In some embodiments, the tubes are made of different metals inside sections 1016, 1018, and 1020. In some embodiments, more than three sections are provided, each with an induction heating element.

In some embodiments, the heat exchanger further comprises a shell and tube style exchanger, a plate style exchanger, a plate and frame style exchanger, a plate and shell style exchanger, a spiral style exchanger, a plate fin style exchanger, or combinations thereof.

In some embodiments, the first metal comprises aluminum, steel, copper, tungsten, brass, tin, bronze, nickel, or combinations thereof. In some embodiments, the second metal comprises aluminum, steel, copper, tungsten, brass, tin, bronze, nickel, or combinations thereof. In either of these embodiments, the steel may be a stainless steel that is electroplated or mechanically bonded with another metal. Individual metals may vary by purity for different conductivities. In some embodiments, this includes oxygen content in the metal varying, causing varying heating rates. In some embodiments, a portion of a refractory material, the refractory material further comprising ceramics.

In some embodiments, the carrier liquid comprises water, brine, hydrocarbons, liquid ammonia, liquid carbon dioxide, other cryogenic liquids, and combinations thereof. In some embodiments, the carrier liquid comprises 1,1,3-trimethylcyclopentane, 1,4-pentadiene, 1,5-hexadiene, 1-butene, 1-methyl-1-ethylcyclopentane, 1-pentene, 3,3,3,3-tetrafluoropropene, 3,3-dimethyl-1-butene, 3-chloro-1,1,1,2-tetrafluoroethane, 3-methylpentane, 3-methyl-1,4-pentadiene, 3-methyl-1-butene, 3-methyl-1-pentene, 3-methylpentane, 5-methyl-1-hexene, 5-methyl-1-pentene, 5-methylcyclopentene, 5-methyl-trans-2-pentene, bromochlorodifluoromethane, bromodifluoromethane, bromotrifluoroethylene, chlorotrifluoroethylene, cis 3-hexene, cis-1,3-pentadiene, cis-2-hexene, cis-2-pentene, dichlorodifluoromethane, difluoromethyl ether, trifluoromethyl ether, dimethyl ether, ethyl fluoride, ethyl mercaptan, hexafluoropropylene, isobutane, isobutene, isobutyl mercaptan, isopentane, isoprene, methyl isopropyl ether, methylcyclohexane, methylcyclopentane, methylcyclopropane, n,n-diethylmethylamine, octafluoropropane, pentafluoroethyl trifluorovinyl ether, propane, sec-butyl mercaptan, trans-2-pentene, trifluoromethyl trifluorovinyl ether, vinyl chloride, bromotrifluoromethane, chlorodifluoromethane, dimethyl silane, ketene, methyl silane, perchloryl fluoride, propylene, vinyl fluoride, methanol, ethanol, 1-propanol, 2-propanol, aqueous mixtures thereof, or combinations thereof.

In some embodiments, the fouling component comprises carbon dioxide, nitrogen oxide, sulfur dioxide, nitrogen dioxide, sulfur trioxide, hydrogen sulfide, hydrogen cyanide, water, condensed hydrocarbons, or combinations thereof. In some embodiments, the fouling component further comprises a solid portion comprising particulates, mercury, other heavy metals, condensed organics, soot, inorganic ash components, biomass, salts, water ice, other impurities common to a vitiated flow, producer gases, or other industrial flows, or combinations thereof.

In some embodiments, the coolant comprises liquid nitrogen, ethane, methane, propane, or other refrigerants.

In some embodiments, a portion of the carrier liquid freezes onto the inner surface of the process side conduit as a portion of the foulant.

In some embodiments, the frequency of the electrical current to the induction heating element or elements is varied. Varying frequencies allows for higher or lower heating of the metals. In some embodiments, the amount of electrical current to the one or more induction heating elements is varied. This also allows for higher or lower heating of the metals.

The invention claimed is:

1. An apparatus comprising:
   a heat exchanger comprising a coolant side conduit and a process side conduit, the process side conduit being susceptible to fouling by at least partial desublimation, condensation, crystallization, deposition, or combinations thereof of a fouling component of a circulating process fluid;
   an electrically conductive first metal disposed adjacent to the process side conduit;
   one or more induction heating elements disposed proximate to the heat exchanger;
   the one or more induction heating elements being connected to a source of electrical current; wherein when the electrical current flows through the induction heating elements, eddy currents are induced in the first metal, and thereby heat the first metal such that the fouling component sublimates, melts, absorbs, or a combination thereof into the circulating process fluid; and
   wherein the heat exchanger comprises a plate and frame heat exchanger, wherein the plates comprise alternating strips of the first metal and strips of a second material.

2. The apparatus of claim 1, wherein the second material comprises a non-conductive material and the one or more induction heating elements are positioned such that the one or more induction heating elements induce the eddy currents in the first metal.

3. The apparatus of claim 1, wherein the second material comprises an electrically conductive second metal, wherein the second metal is more conductive than the first metal.

4. The apparatus of claim 3, wherein the one or more induction heating elements are positioned such that the one or more induction heating elements induce the eddy currents in the first metal and the second metal.

5. The apparatus of claim 1, wherein the first metal comprises aluminum, steel, copper, tungsten, brass, tin, bronze, nickel, or combinations thereof.

6. The apparatus of claim 1, wherein an electrically conductive second metal is disposed adjacent to the process side conduit, the one or more induction heating elements inducing the eddy currents in the second metal, inductively heating the second metal such that the fouling component melts, absorbs, or combinations thereof off the inner surface of the process side.

7. The apparatus of claim 1, wherein the first metal comprises a portion of a refractory material, the refractory material further comprising ceramics.

* * * * *